E. P. HOOD.
WHEEL-FELLIES.

No. 185,031. Patented Dec. 5, 1876.

WITNESSES:
Francis McArdle
John Goethals

INVENTOR:
E. P. Hood
BY Munn & Co.
ATTORNEYS.

THE GRAPHIC CO. N.Y.

UNITED STATES PATENT OFFICE.

EDWARD P. HOOD, OF NEW BOSTON, MASSACHUSETTS.

IMPROVEMENT IN WHEEL-FELLIES.

Specification forming part of Letters Patent No. 185,031, dated December 5, 1876; application filed May 9, 1876.

*To all whom it may concern:*

Figure 1:
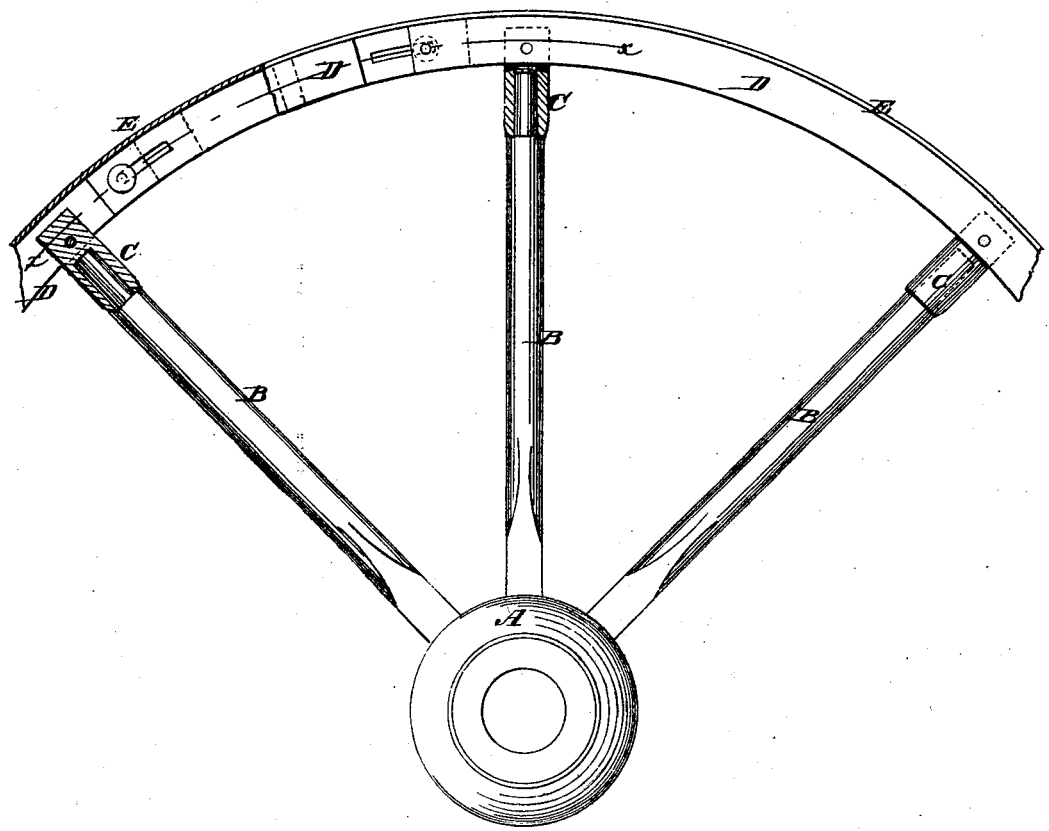
Figure 2:
Figure 3:
Figure 4:

Be it known that I, EDWARD PAYSON HOOD, of New Boston, Berkshire county, State of Massachusetts, have invented a new and Improved Wheel, of which the following is a specification:

In the accompanying drawing, Figure 1 is a side view of a portion of one of my improved wheels. Fig. 2 is a detail section of a portion of the rim, taken through the line X X, Fig. 1. Fig. 3 is a detail cross-section of the rim; and Fig. 4 is a detail cross-section, showing a modification of the rim.

The object of this invention is to form an improved wheel for vehicles, light, strong, durable, and not liable to get out of order.

The invention will first be described in connection with the drawing, and then pointed out in the claim.

In the drawing, A represents the hubs, and B the spokes, of a wheel. The ends of the spokes are inserted in metallic sockets C, the outer ends of which are solid, and their cavities are made nearly as large as the spokes, so as to avoid weakening the said spokes by forming small tenons upon them. To the opposite sides of the outer ends of the sockets C are attached ring-plates D, which form the rim of the wheel, and about which the tire E is shrunk, in the usual way. The plates D are open, and have plates attached to the inner side of one end, or have an offset of the thickness of the said plate, so that the ends may overlap each other. The overlapped ends of the plates D are secured to each other by a rivet, which passes through a hole in the outer end and a slot in the inner end, so that the shrinkage of the tire may bring the rim down firmly upon the spokes.

The inner edges of the ring-plates D may have flanges formed upon them, to project inwardly and meet, as shown in Fig. 4, and thus close the inner side of the rim.

Having thus described my invention, what I claim as new, and desire to secure by Letters Patent, is—

The ring-plates D, made open, and with a splice or lap, to enable the shrinkage of the tire E, to bring them down firmly upon the spokes, substantially as herein shown and described.

EDWARD PAYSON HOOD.

Witnesses:
   NELLIE S. MOURY,
   ALFRED H. HOOD.